United States Patent
Fujita

(10) Patent No.: US 8,155,068 B2
(45) Date of Patent: Apr. 10, 2012

(54) BASE-STATION APPARATUS, MOBILE MACHINE, COMMUNICATION SYSTEM, AND CHANNEL ALLOCATION METHOD

(75) Inventor: Hiroshi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/431,516

(22) Filed: Apr. 28, 2009

(65) Prior Publication Data

US 2010/0008321 A1 Jan. 14, 2010

(30) Foreign Application Priority Data

Jul. 9, 2008 (JP) ................................ 2008-179431

(51) Int. Cl.
*H04W 4/00* (2009.01)
(52) U.S. Cl. ........................................ 370/329; 370/338
(58) Field of Classification Search .................. 370/343, 370/252, 203, 206, 329, 338, 208, 236–236.2
See application file for complete search history.

(56) References Cited

U.S. PATENT DOCUMENTS

| | | | | |
|---|---|---|---|---|
| 2001/0053124 A1* | 12/2001 | Ichihara et al. | ............... | 370/206 |
| 2004/0192218 A1* | 9/2004 | Oprea | ............................. | 455/73 |
| 2006/0221807 A1* | 10/2006 | Fukuoka et al. | ............. | 370/203 |

FOREIGN PATENT DOCUMENTS

| | | |
|---|---|---|
| JP | 11298439 | 10/1999 |
| JP | 2001358692 | 12/2001 |
| JP | 3575983 | 7/2004 |
| JP | 2004350326 | 12/2004 |
| JP | 3786129 | 3/2006 |
| WO | 2005006622 | 1/2005 |

OTHER PUBLICATIONS

Design and implementation of Simulator Based on a Cross-Layer Protocol between MAC and PHY Layers in a WiBro Compatible IEEE 802.16E OFDMA System, T. kwon, et al, IEEE Com. Magazine, Dec. 2005.
IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Computer Society and the IEEE Microwave Theory and Techniques Society IEEE Std 802.16e-2005 and IEEE Std 802.16-2004/Cor1-2005.
IEEE Standard for Local and metropolitan area networks Part 16: Air Interface for Fixed Broadband Wireless Access Systems IEEE Computer Society and the IEEE Microwave Theory and Techniques Society IEEE Std 802.16-2004.

* cited by examiner

*Primary Examiner* — Michael Faragalla
(74) *Attorney, Agent, or Firm* — Fujitsu Patent Center

(57) ABSTRACT

A base-station apparatus measures a frequency variation and time variation based on a signal transmitted from a mobile machine. Then, based on the measured frequency variation and time variation, the base-station apparatus allocates either an adjacent sub-channel or a distributed sub-channel to the mobile machine. With this, the base-station apparatus allocates a sub-channel according to the wireless propagation environment where the mobile machine is located.

9 Claims, 12 Drawing Sheets

BASE-STATION APPARATUS, MOBILE MACHINE, COMMUNICATION SYSTEM, AND CHANNEL ALLOCATION METHOD

CROSS-REFERENCE TO RELATED APPLICATION(S)

This application is based upon and claims the benefit of priority of the prior Japanese Patent Application No. 2008-179431, filed on Jul. 9, 2008, the entire contents of which are incorporated herein by reference.

FIELD

The embodiment(s) discussed herein is (are) directed to a base-station apparatus, a mobile machine, a communication system, and a channel allocation method.

BACKGROUND

In recent years, as a transmission technique for mobile communication systems, an Orthogonal Frequency Division Multiple Access (OFDMA) technique allowing the efficient use of frequency bands has attracted attention. In the OFDMA technique, information is transmitted and received between a base-station apparatus and a mobile machine by using a plurality of sub-channels. A sub-channel is an information transmission channel including sub-carriers of different frequency bands, and is allocated by the base-station apparatus to any of mobile machines in a mobile communication system.

Examples of a technique for the base-station apparatus to allocate a sub-channel to each mobile machine include a Band-Adaptive Modulation and Coding (Band-AMC) technique, a Partial Usage of Sub-channel (PUSC) technique, a Full Usage of Sub-channel (FUSC) technique, and others. In the Band-AMC technique, a sub-channel including a plurality of sub-carriers with frequency bands adjacent to each other (hereinafter, referred to "adjacent sub-channel") is allocated to one mobile machine.

Specific explanation is now made by using FIG. 16A. In FIG. 16A, an example is depicted in which sub-carriers C11 to C14, C21 to C24, C31 to C34, and C41 to C44 of different frequency bands are used for wireless communication. With such sub-carriers, a base-station apparatus adopting the Band-AMC technique allocates, for example, an adjacent sub-channel CH1 including the sub-carriers C11 to C14 with frequency bands adjacent to each other, to a mobile machine A. Also, for example, the base-station apparatus adopting the Band-AMC technique allocates an adjacent sub-channel CH2 including the sub-carriers C21 to C24 with frequency bands adjacent to each other to a mobile machine B. At this time, the base-station apparatus allocates a high-quality adjacent sub-channel to each mobile machine. In this manner, the Band-AMC technique has advantages such that a user diversity effect can be obtained in an environment where frequency-selective fading occurs, and throughput can be increased with the increase of an adaptive modulation effect.

In the PUSC technique and the FUSC technique, a sub-channel including a plurality of sub-carriers with distributed frequency bands (hereinafter, referred to as "distributed sub-channel") is allocated to one mobile machine.

Specific explanation is now made by using FIG. 16B. In FIG. 16B, as with the example depicted in FIG. 16A, an example is depicted in which sub-carriers C11 to C14, C21 to C24, C31 to C34, and C41 to C44 are used for wireless communication. With such sub-carriers, a base-station apparatus adopting the PUSC technique or the FUSC technique allocates, for example, a distributed sub-channel CH5 including the sub-carriers C11, C21, C31, and C41 with distributed frequency bands, to the mobile machine A. Also, for example, the base-station apparatus adopting the PUSC technique or the FUSC technique allocates a distributed sub-channel CH5 including the sub-carriers C12, C22, C32, and C42 with distributed frequency bands to the mobile machine B. In the PUSC technique or the FUSC technique, an average quality sub-channel is allocated to each mobile machine. Therefore, the PUSC technique and the FUSC technique have an advantage such that stable wireless quality can be obtained.

Examples of the conventional technologies are disclosed in International Publication Pamphlet No. WO 05/006622, Japanese Laid-open Patent Publication No. 11-298439, Japanese Laid-open Patent Publication No. 2004-350326, Japanese Laid-open Patent Publication No. 2001-358692, and "Design and implementation of Simulator Based on a Cross-Layer Protocol between MAC and PHY layers in a WiBro Compatible IEEE 802.16e OFDMA Systems", T. kwon, et al., IEEE Communication Magazine, December, 2005, pp. 136-146.

However, in the conventional mobile communication system using the OFDMA technique has problems such that a reception error may occur at any mobile machine and a sub-channel cannot be appropriately allocated to each mobile machine according to the wireless propagation environment where the mobile machine is located.

Specifically, in the Band-AM technique, to allocate a high-quality adjacent sub-channel to each mobile machine, the adjacent sub-channel to be allocated may be frequently changed for a mobile machine whose wireless propagation environment is frequently varied. In this case, wireless information at the time of allocating the adjacent sub-channel and the wireless propagation environment where the mobile machine is located may not match each other. For this reason, the Band-AMC technique has a problem such that a reception error may occur at the mobile machine.

Moreover, in the PUSC technique and the FUSC technique, merely an average wireless quality can be obtained whatever is a distributed sub-channel allocated to each mobile machine. Therefore, the PUSC technique and the FUSC technique have a problem such that high-quality wireless communication cannot be expected even if the wireless propagation environment where the mobile machine is located is excellent.

SUMMARY

According to an aspect of an embodiment, a base-station apparatus that communicates with a mobile machine by using a plurality of information transmission channels with different frequency bands, includes a frequency-variation measuring unit that measures, based on a signal transmitted from the mobile machine, a frequency variation, which is a variation in signal strength of the signal with respect to a change in frequency; a time-variation measuring unit that measures, based on the signal transmitted from the mobile machine, a time variation, which is a variation in signal strength of the signal with respect to a lapse of time; and a channel allocating unit that allocates an adjacent channel including an information transmission channel with frequency bands adjacent to each other to the mobile machine when the frequency variation measured by the frequency-variation measuring unit is larger than a predetermined frequency-variation threshold and the time variation measured by the time-variation measuring unit is smaller than a predetermined time-variation threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Embodiments of the base-station apparatus, mobile machine, communication system, and channel allocation method disclosed in the present application are explained in detail below with reference to the accompanying drawings. Note that the embodiments do not restrict the base-station apparatus, mobile machine, communication system, and channel allocation method disclosed in the present application.

Figure 1:
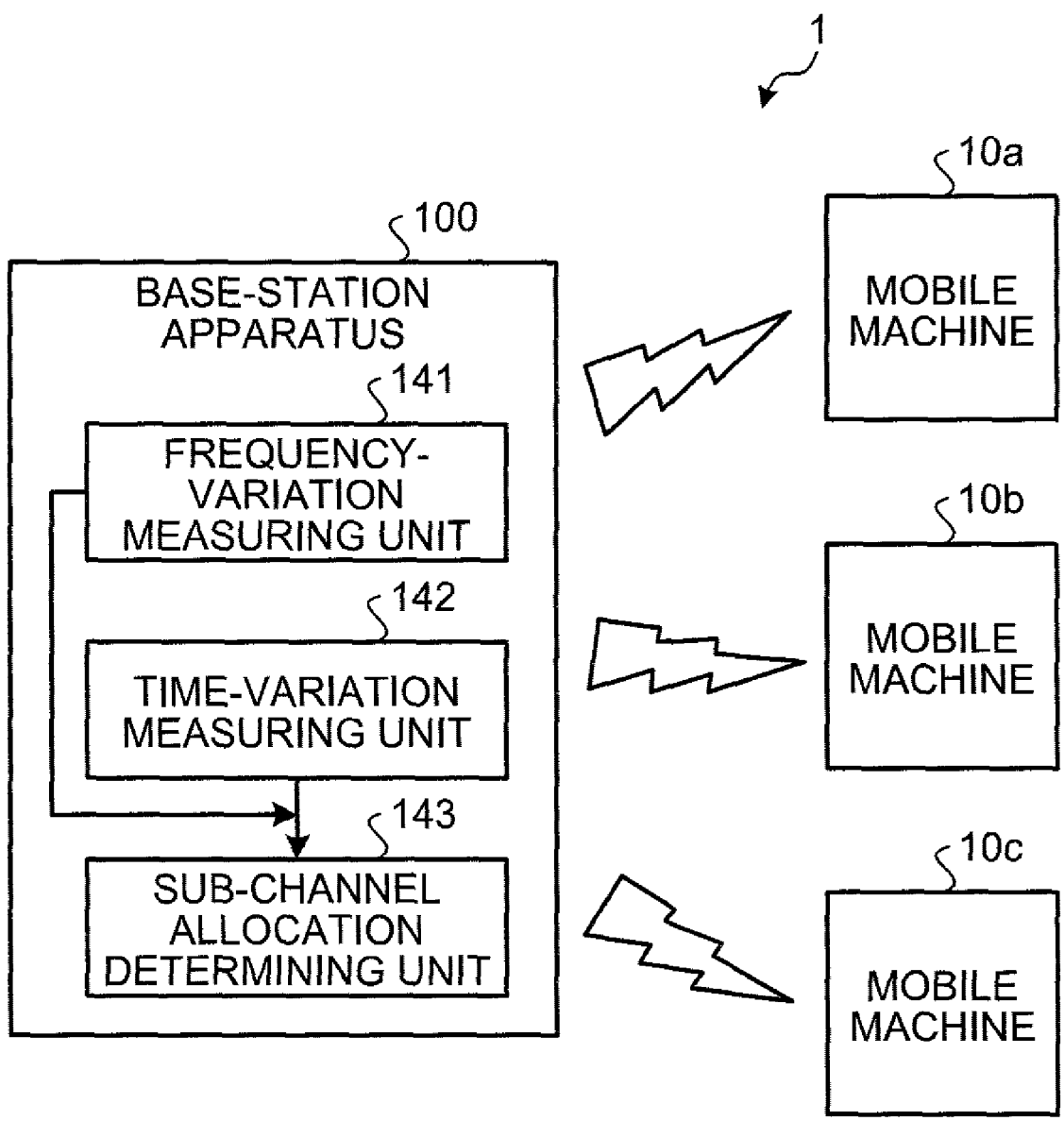
FIG. 1 is a drawing of a communication system including a base-station apparatus according to a first embodiment.

First, a communication system including a base-station apparatus 100 according to a first embodiment is explained. FIG. 1 is a drawing of a communication system 1 including the base-station apparatus 100 according to the first embodiment. As depicted in FIG. 1, the communication system 1 includes mobile machines 10a to 10c and the base-station apparatus 100.

The mobile machines 10a to 10c are portable terminals or the like, performing wireless communication with the base-station apparatus 100. In the following explanation, the mobile machines 10a to 10c are collectively represented as a mobile machine 10 unless any of them is required to be specified.

The base-station apparatus 100 is a communication apparatus that performs wireless communication with the mobile machine 10, and includes a frequency-variation measuring unit 141, a time-variation measuring unit 142, and a sub-channel allocation determining unit 143. The frequency-variation measuring unit 141 measures a variation in signal strength with respect to changes in frequency (hereinafter, referred to as "frequency variation"), based on a signal transmitted from the mobile machine 10. The time-variation measuring unit 142 measures a variation in signal strength with respect to a lapse of time (hereinafter, referred to as "time variation"), based on the signal transmitted from the mobile machine 10. The sub-channel allocation determining unit 143 determines a sub-channel to be allocated to the mobile machine 10, based on the frequency variation measured by the frequency-variation measuring unit 141 and the time variation measured by the time-variation measuring unit 142.

Figure 2A:
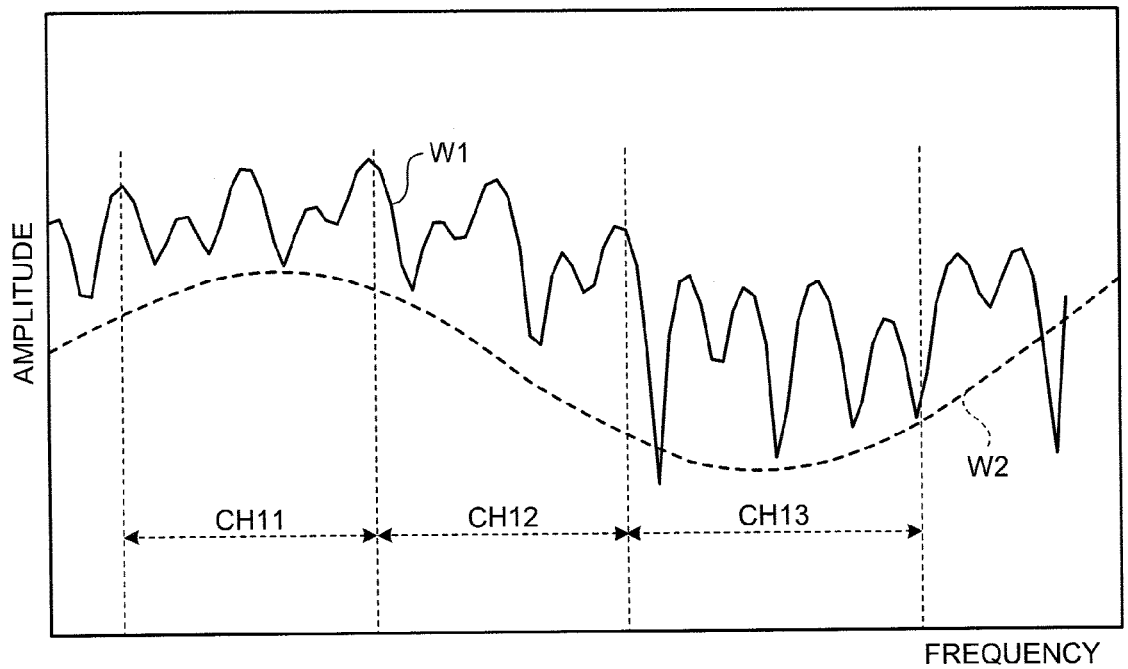
FIG. 2A is a drawing of an example of a frequency variation.
Figure 2B:
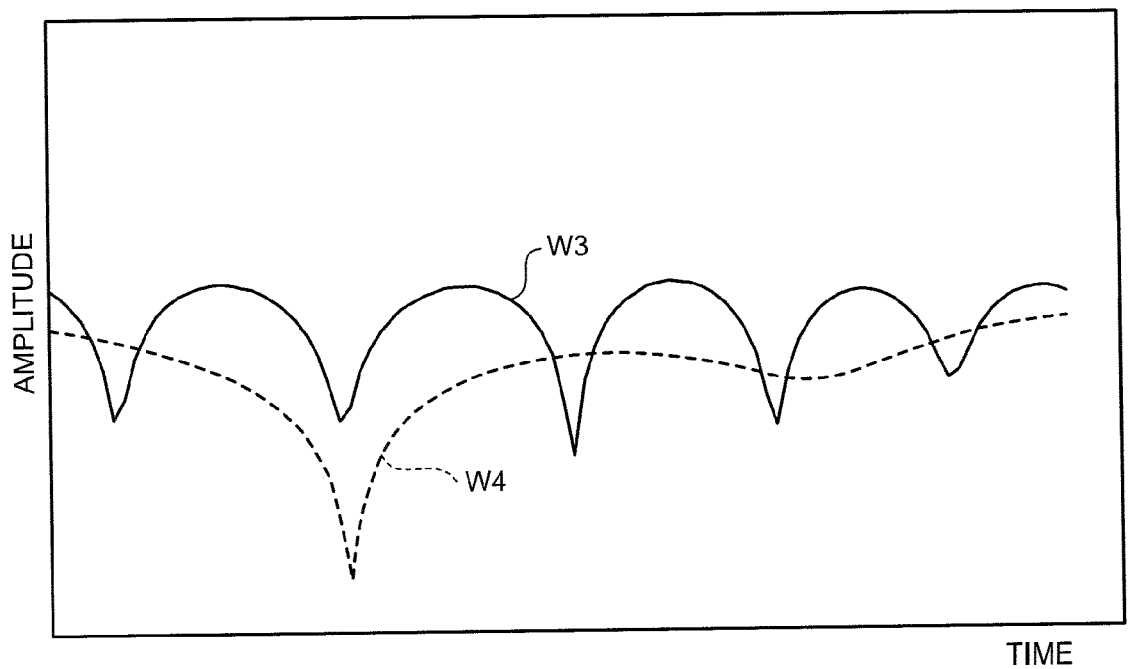
FIG. 2B is a drawing of an example of a time variation.

Specific explanation is now made by using FIGS. 2A and 2B. FIG. 2A is a drawing of an example of a frequency variation. In the example depicted in FIG. 2A, a waveform W1 has a larger variation in signal strength with respect to changes in frequency, compared with a waveform W2. This means that a mobile machine that transmits a signal with a frequency variation as represented by the waveform W1 is in a wireless propagation environment with a large frequency variation, compared with a mobile machine that transmits a signal with a frequency variation as represented by the waveform W2.

FIG. 2B is a drawing of an example of a time variation. In the example depicted in FIG. 2B, a waveform W3 has a larger variation in signal strength with respect to a lapse of time, compared with a waveform W4. This means that a mobile machine that transmits a signal with a time variation as represented by the waveform W3 is in a wireless propagation environment with a large time variation, compared with a mobile machine that transmits a signal with a time variation as represented by the waveform W4. For example, it can be assumed that the mobile machine that transmits a signal with a time variation as represented by the waveform W3 is moving quickly, because the wireless propagation environment changes as the mobile machine moves. On the other hand, it can be assumed that the mobile machine that transmits a signal with a time variation as represented by the waveform W4 is moving slowly or is at a standstill.

The frequency-variation measuring unit 141 of the base-station apparatus 100 measures, for each mobile machine, a frequency variation as depicted in FIG. 2A, based on the signal transmitted from the mobile machine 10. Also, the time-variation measuring unit 142 of the base-station apparatus 100 measures, for each mobile machine, a time variation as depicted in FIG. 2B, based on the signal transmitted from the mobile machine 10. Furthermore, the sub-channel allocation determining unit 143 of the base-station apparatus 100 allocates an adjacent sub-channel to the mobile machine 10 in a wireless propagation environment with a large frequency variation and a small time variation, with the use of the Band-AMC technique. On the other hand, the sub-channel allocation determining unit 143 allocates a distributed sub-channel to the mobile machine 10 in a wireless propagation environment with a small frequency variation or a large time variation, with the use of the PUSC technique or FUSC technique.

The reason for allocating a sub-channel in the manner is now explained. For example, it is assumed that an adjacent sub-channel is allocated to the mobile machine in a wireless propagation environment with a small frequency variation. In this case, when the allocated adjacent sub-channel has many sub-carriers with high signal strength, as a sub-channel CH11 depicted in FIG. 2A, the wireless quality is extremely high. However, when the allocated adjacent sub-channel has many sub-carriers with low signal strength, as a sub-channel CH13 depicted in FIG. 2A, the wireless quality is extremely low. In this case, the base-station apparatus may not be able to communicate with the mobile machine 10. As such, if an adjacent sub-channel is allocated when the frequency variation is small, a difference in signal strength among the mobile machines is so significant that the quality of the entire wireless network system is decreased.

For this reason, the base-station apparatus 100 allocates a distributed sub-channel to the mobile machine 10 in a wireless propagation environment with a small frequency variation. With this, averaged wireless quality can be achieved among the channel-allocated mobile machines, thereby increasing the quality of the entire wireless network system.

Also, for example, it is assumed that an adjacent sub-channel is allocated to the mobile machine in a wireless propagation environment with a large time variation. In this case, as explained above, the sub-channel to be allocated by the base-station apparatus 100 to the mobile machine 10 has to be frequently changed, and therefore a reception error may occur at the mobile machine 10.

For this reason, the base-station apparatus 100 allocates a distributed sub-channel to the mobile machine 10 in a wireless propagation environment with a large time variation. With this, averaged wireless quality can be achieved among the channel-allocated mobile machines, and therefore the wireless propagation environment of the mobile machine 10 is not frequently varied. Thus, the base-station apparatus 100 does not have to frequently change a sub-channel to be allocated to the mobile machine 10. As a result, the occurrence of a reception error at the mobile machine 10 can be prevented.

Furthermore, the base-station apparatus 100 allocates an adjacent sub-channel to the mobile machine 10 in a wireless propagation environment with a large frequency variation and a small time variation. This is because, even if an adjacent sub-channel is allocated in the case of a large frequency variation, a frequency band with high signal strength is included in the adjacent sub-channel. That is, even if an adjacent sub-channel is allocated in the case of a large frequency variation, the base-station apparatus 100 and the mobile machine 10 can perform wireless communication by using a frequency band with high signal strength. Also, even if an adjacent sub-channel is allocated in the case of a small time variation, the wireless propagation environment of the mobile machine 10 is not frequently varied with a lapse of time. Therefore, the adjacent sub-channel to be allocated by the base-station apparatus 100 to the mobile machine 10 does not have to be frequently changed.

As such, the base-station apparatus 100 according to the first embodiment measures a frequency variation and a time variation based on a signal transmitted from the mobile machine 10. Based on the measured frequency variation and time variation, the base-station apparatus 100 allocates either an adjacent sub-channel or distributed sub-channel to the mobile machine 10.

Specifically, the base-station apparatus 100 allocates an adjacent sub-channel to the mobile machine 10 in a wireless propagation environment with a large frequency variation and a small time variation. With this, the base-station apparatus 100 can increase throughput without frequently changing the sub-channel to be allocated to the mobile machine 10.

Also, the base-station apparatus 100 allocates a distributed sub-channel to the mobile machine 10 in a wireless propagation environment with a small frequency variation or a large time variation. With this, the base-station apparatus 100 can allocate a high-quality sub-channel to each mobile machine.

That is, the base-station apparatus 100 according to the first embodiment can appropriately allocate a sub-channel according to the wireless propagation environment where the mobile machine is located, without causing a reception error at the mobile machine.

Figure 3:
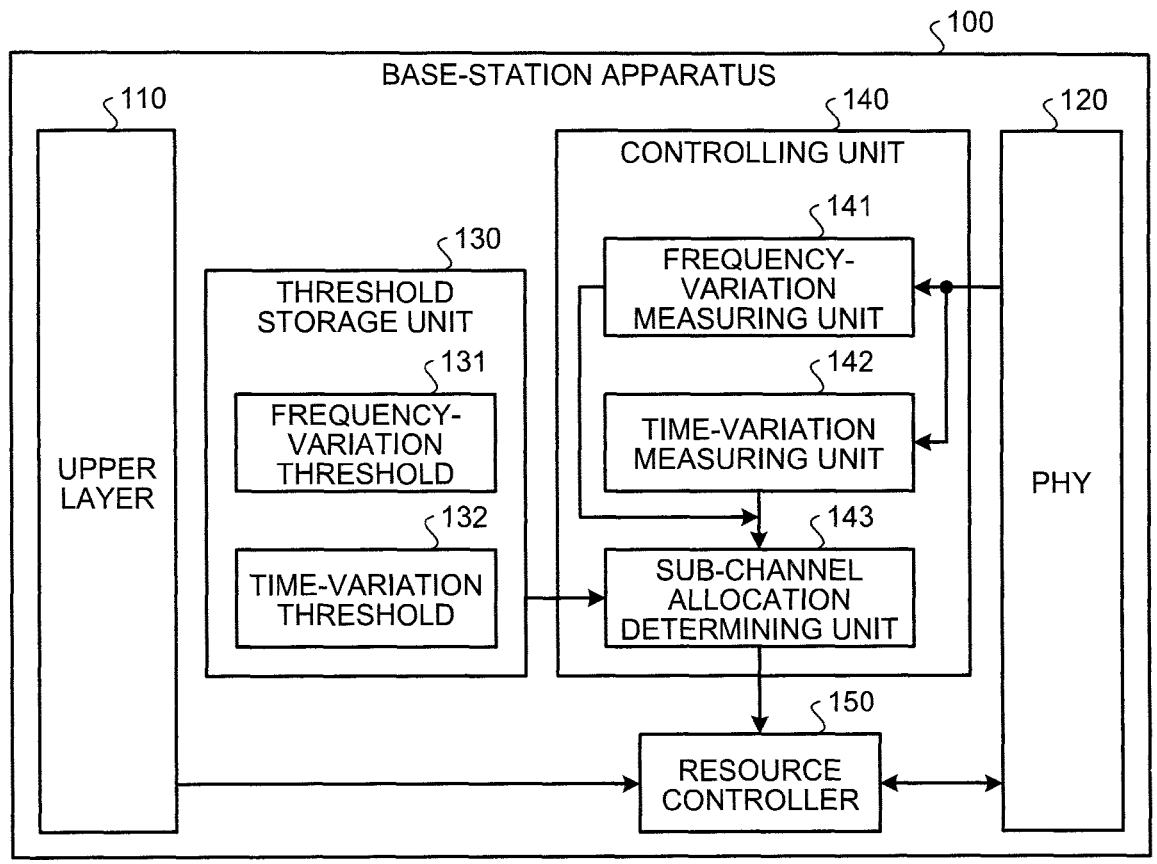
FIG. 3 is a drawing of the configuration of the base-station apparatus according to the first embodiment.

Next, the configuration of the base-station apparatus 100 according to the first embodiment is explained. FIG. 3 is a drawing of the configuration of the base-station apparatus according to the first embodiment. As depicted in FIG. 3, the base-station apparatus 100 includes an upper layer 110, a physical layer (PHY) 120, a threshold storage unit 130, a controlling unit 140, and a resource controller 150.

The upper layer 110 performs communication to transmit and receive various information between the base-station apparatus 100 and an upper apparatus not shown. For example, the base-station apparatus 100 receives, via the upper layer 110, user data to be transmitted from the upper apparatus to each mobile machine and information about a zone size, which is a transmission capacity to be allocated to each mobile machine.

When the mobile communication system adopts Worldwide Interoperability for Microwave Access (WiMAX), the base-station apparatus 100 and the upper apparatus are the same apparatus. In this case, the upper layer 110 receives user data, zone size, and other information from a predetermined processing unit in the base-station apparatus 100.

The PHY 120 is an interface for transmitting and receiving various information between the base-station apparatus 100 and the mobile machine 10. For example, the base-station apparatus 100 transmits user data to the mobile machine 10 via the PHY 120.

The threshold storage unit 130 is a storage device that stores various information, and includes a frequency-variation threshold 131 and a time-variation threshold 132. The frequency-variation threshold 131 stores a threshold for frequency variation. The time-variation threshold 132 stores a threshold for time variation.

The controlling unit 140 allocates a sub-channel to the mobile machine 10. Also, the controlling unit 140 includes the frequency-variation measuring unit 141, the time-variation measuring unit 142, and the sub-channel allocation determining unit 143.

Figure 4:
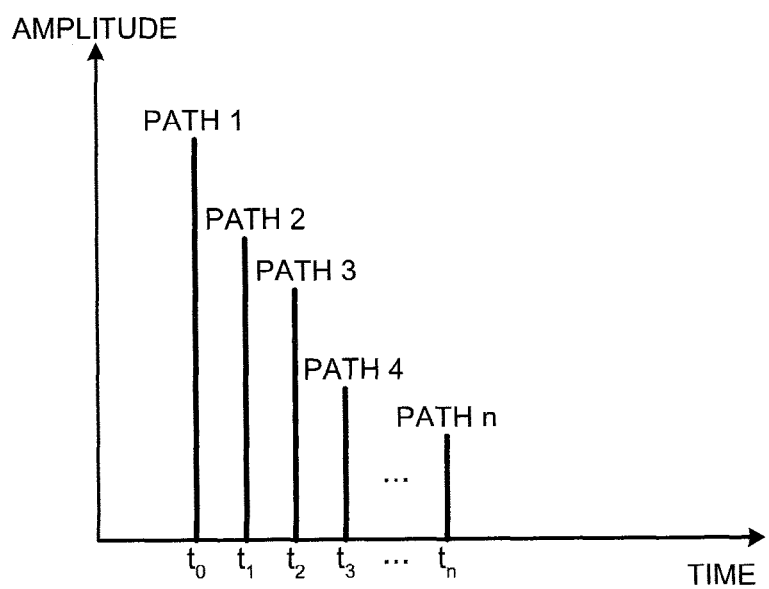
FIG. 4 is a drawing of an example of a delay profile.

The frequency-variation measuring unit 141 measures a frequency variation based on a signal transmitted from the mobile machine 10. Specifically, the frequency-variation measuring unit 141 measures the signal strength of the signal transmitted from the mobile machine 10 at every predetermined time, thereby measuring a delay profile of that signal. An example of the delay profile is depicted in FIG. 4. In the example depicted in FIG. 4, the frequency-variation measuring unit 141 measures a signal strength of a reception signal at a time t0 and a signal strength of the reception signal at a time t1. The frequency-variation measuring unit 141 then measures a signal strength of the reception signal until a time tn.

Subsequently, the frequency-variation measuring unit 141 calculates a delay spread S based on the delay profile. Specifically, the frequency-variation measuring unit 141 calculates the delay spread S with the following equation:

$$S = \sqrt{\frac{1}{P_m}\int t^2 f(t)dt - T_D^2} \quad (1)$$

Here, in Equation 1 above, f(t) is the delay profile, Pm is reception power, and TD is an average delay. The reception power Pm can be found with the following Equation 2, and the average delay TD can be found with the following Equation 3:

$$P_m = \int f(t)dt \quad (2)$$

$$T_D = \frac{1}{P_m}\int (t-t_0)f(t)dt \quad (3)$$

The delay spread S calculated as explained above represents a frequency variation. Specifically, the frequency variation is larger as the delay spread S is larger, whilst the frequency variation is smaller as the delay spread S is smaller.

In the case of an orthogonal frequency division multiplex (OFDM) system, the frequency-variation measuring unit 141 may measure a signal strength as a delay profile of every Finite Fourier Transform (FFT) sampling time in an OFDM symbol. The frequency-variation measuring unit 141 may measure a signal strength of an impulse signal as a delay profile without using FFT.

The time-variation measuring unit 142 measures a time variation based on the signal transmitted from the mobile machine 10. Specifically, the time-variation measuring unit 142 measures a signal strength of the signal transmitted from the mobile machine 10 for every predetermined time. The signal strength measured by the time-variation measuring unit 142 is represented by the waveform W3 or the waveform W4 as exemplarily depicted in FIG. 2B. Then, from the measured signal strength, the time-variation measuring unit 142 measures a fading frequency fd, which is a frequency with varied signal strength.

The fading frequency fd measured as explained above represents a time variation, with the time variation being larger as the fading frequency fd is larger and the time variation being smaller as the fading frequency fd is smaller.

The time-variation measuring unit 142 may measure a fading pitch (also called as "fading period") Td. Since the following Equation 4 holds between the fading frequency fd and the fading pitch Td, the time variation is smaller as the fading pitch Td is larger, whilst the time variation is larger as the fading pitch Td is smaller.

$$f_d = \frac{1}{T_d} \quad (4)$$

The sub-channel allocation determining unit 143 determines a sub-channel to be allocated to the mobile machine 10 based on the frequency variation (delay spread S) measured by the frequency-variation measuring unit 141 and the time variation (fading frequency fd) measured by the time-variation measuring unit 142. Specifically, the sub-channel allocation determining unit 143 determines whether the frequency variation measured by the frequency-variation measuring unit 141 is larger than the frequency-variation threshold stored in the frequency-variation threshold 131. Also, the sub-channel allocation determining unit 143 determines whether the time variation measured by the time-variation measuring unit 142 is smaller than the time-variation threshold stored in the time-variation threshold 132.

When the frequency variation is larger than the frequency-variation threshold and the time variation is smaller than the time-variation threshold, the sub-channel allocation determining unit 143 determines to allocate an adjacent sub-channel to the mobile machine 10 with the use of the Band-AMC technique. On the other hand, when the frequency variation is equal to or smaller than the frequency-variation threshold or the time variation is equal to or larger than the time-variation threshold, the sub-channel allocation determining unit 143 determines to allocate a distributed sub-channel to the mobile machine 10 with the use of the PUSC technique or the FUSC technique.

Figure 16A:
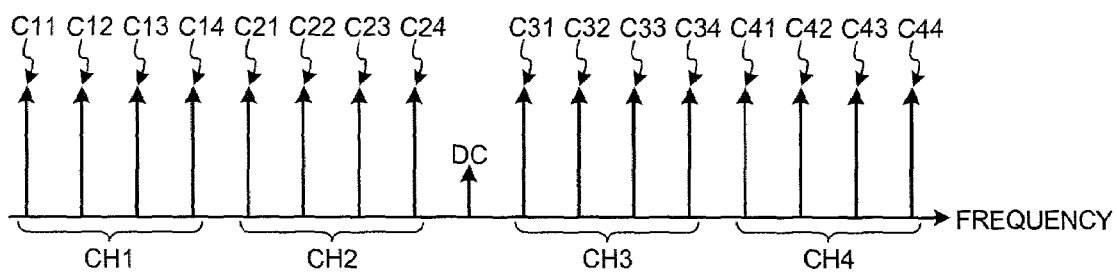
FIG. 16A is a drawing for explaining adjacent sub-channels.
Figure 16B:
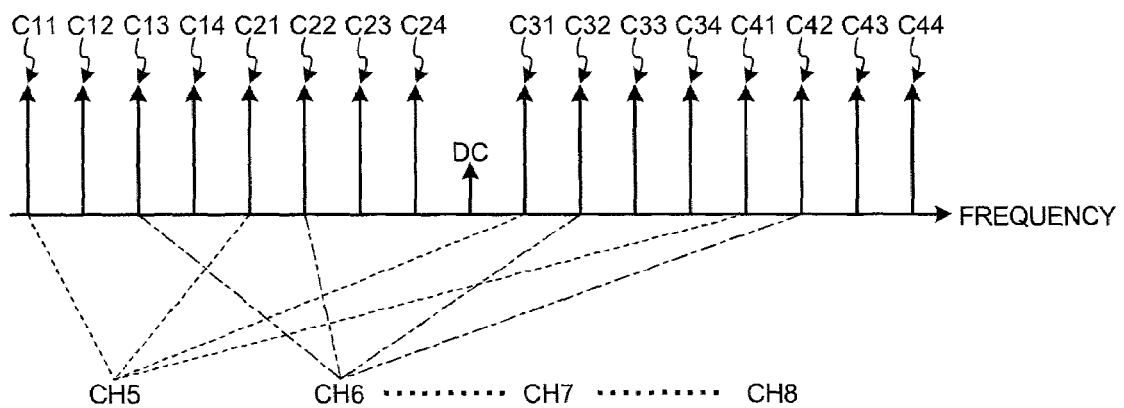
FIG. 16B is a drawing for explaining distributed sub-channels.

Examples depicted in FIGS. 16A and 16B are used for explanation. For example, it is assumed that the frequency variation of the mobile machine A is larger than the frequency-variation threshold and the time variation of the mobile machine A is smaller than the time-variation threshold. In this case, the sub-channel allocation determining unit 143 determines to allocate any one of adjacent sub-channels CH1 to CH4 exemplarily depicted in FIG. 16A to the mobile machine A. Also, for example, it is assumed that the frequency variation of the mobile machine B is equal to or smaller than the frequency-variation threshold and the time variation of the mobile machine B is equal to or larger than the time-variation threshold. In this case, the sub-channel allocation determining unit 143 determines to allocate any one of distributed sub-channels CH5 to CH8 exemplarily depicted in FIG. 16B to the mobile machine B.

The resource controller 150 allocates a wireless resource to each mobile machine based on the sub-channel determined by the sub-channel allocation determining unit 143. Specifically, the resource controller 150 allocates user data input via the upper layer 110 to the sub-channel determined by the sub-channel allocation determining unit 143. Also, based on a zone size received from the upper apparatus, the resource controller 150 determines a transmission capacity to be allocated to each sub-channel. The resource controller 150 then transmits the user data allocated to each sub-channel to the mobile machine 10 via the PHY 120.

Figure 5:
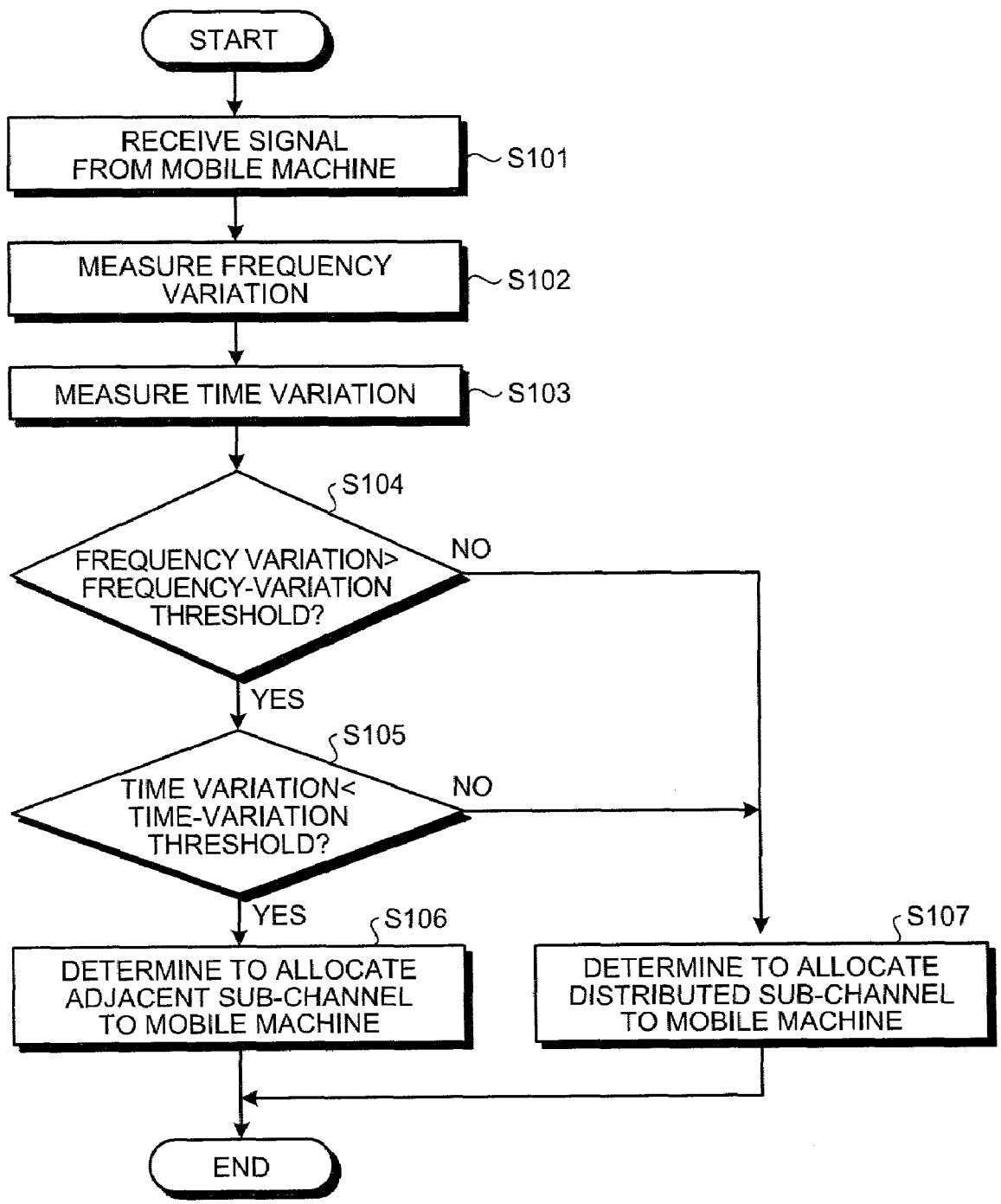
FIG. 5 is a flowchart of a procedure of a sub-channel allocation determining process by the base-station apparatus according to the first embodiment.

Next, a procedure of a sub-channel allocation determining process by the base-station apparatus 100 according to the first embodiment is explained. FIG. 5 is a flowchart of a procedure of a sub-channel allocation determining process by the base-station apparatus 100 according to the first embodiment. As depicted in FIG. 5, when a signal is received from the mobile machine 10 (Step S101), the frequency-variation measuring unit 141 of the base-station apparatus 100 measures a frequency variation based on the received signal (Step S102). Also, the time-variation measuring unit 142 measures a time variation based on the received signal (Step S103).

Subsequently, when the frequency variation measured by the frequency-variation measuring unit 141 is larger than the frequency-variation threshold (Yes at Step S104) and the time variation measured by the time-variation measuring unit 142 is smaller than the time-variation threshold (Yes at Step S105), the sub-channel allocation determining unit 143 determines to allocate an adjacent sub-channel to the mobile machine 10 (Step S106). On the other hand, when the frequency variation is equal to or smaller than the frequency-variation threshold (No at Step S104) or the time variation is equal to or larger than the time-variation threshold (No at Step S105), the sub-channel allocation determining unit 143 determines to allocate a distributed sub-channel to the mobile machine 10 (Step S107).

As explained above, the base-station apparatus 100 according to the first embodiment measures a frequency variation and time variation based on a signal transmitted from the mobile machine 10. Then, based on the measured frequency variation and time variation, the base-station apparatus 100 allocates either an adjacent sub-channel or a distributed sub-channel to the mobile machine 10. With this, the base-station apparatus 100 can appropriately allocate a sub-channel according to the wireless propagation environment where the mobile machine is located without causing a reception error at the mobile machine.

Figure 6:
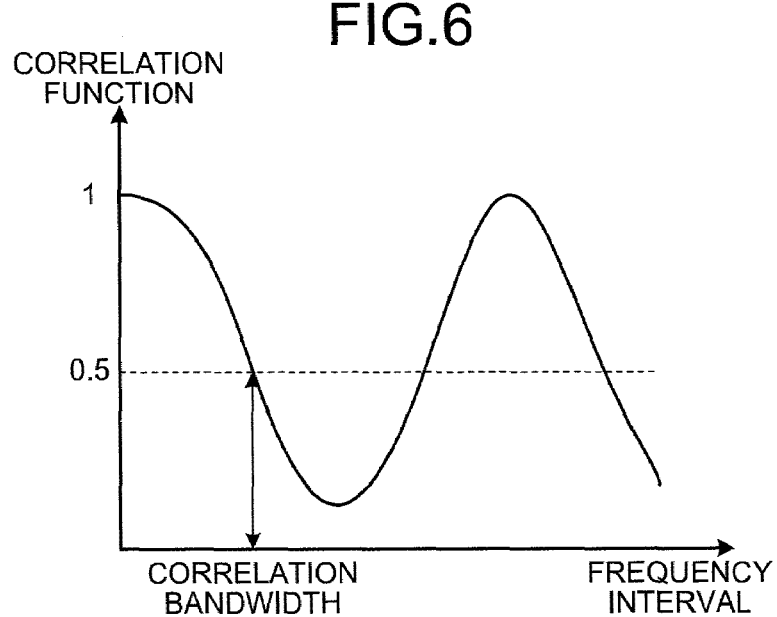
FIG. 6 is a drawing of an example of a correlation function.

Here, in the first embodiment, an example is explained where the delay spread S is calculated as a frequency variation. However, the frequency variation may be calculated with another technique. For example, the frequency-variation measuring unit 141 may measure the signal strength for each sub-carrier to calculate a correlation function in signal strength and may calculate, as a frequency variation, a frequency interval with the correlation function having a predetermined value. FIG. 6 depicts an example of the correlation function. In FIG. 6, an example is depicted in which a frequency interval with a correlation coefficient of 0.5 is calculated as a frequency variation by the frequency-variation measuring unit 141. As such, the calculated frequency interval represents a frequency variation. The frequency variation is larger as the frequency interval is smaller, whilst the frequency variation is smaller as the frequency interval is larger.

Also, in the first embodiment, the example is explained in which, as a time variation, the signal strength of the signal input from the mobile machine 10 is measured for every predetermined time, thereby calculating the fading frequency fd or the fading pitch Td. Alternatively, another technique may be used to calculate a time variation. For example, the time-variation measuring unit 142 may measure a traveling speed of the mobile machine 10 to calculate the fading frequency fd or the fading pitch Td. Specifically, the time-variation measuring unit 142 measures the traveling speed of the mobile machine 10 based on a time variation of coordinate information of the mobile machine 10. Since the following Equation 5 holds between a traveling speed v of the mobile machine 10 and the fading frequency fd, the time-variation measuring unit 142 can calculate the fading frequency fd from the traveling speed v of the mobile machine 10.

$$f_d = \frac{f_c v}{v_c} \quad (5)$$

Here, vc in Equation 5 is a light velocity.

Meanwhile, in the first embodiment, the example is explained in which the base-station apparatus 100 determines the mode of sub-channel to be allocated to the mobile machine (either an adjacent sub-channel or a distributed sub-channel). However, the mobile machine itself may determine the mode of sub-channel to be allocated to itself. Thus, in a second embodiment, an example of a communication system including a mobile machine that determines the mode of sub-channel to be allocated to itself and a base-station apparatus that allocates a sub-channel based on the mode of sub-channel determined by the mobile machine is explained.

Figure 7:
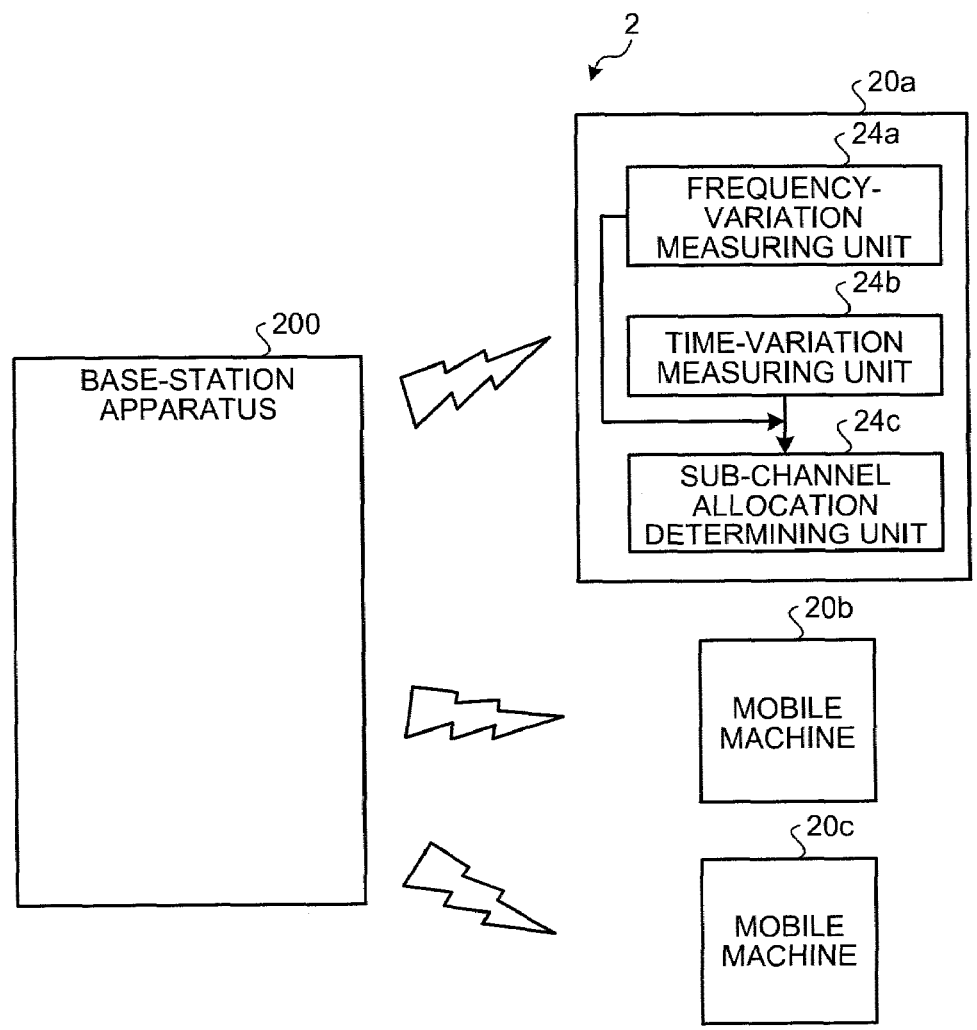
FIG. 7 is a drawing of a communication system according to a second embodiment.

First, a communication system 2 according to the second embodiment is explained. FIG. 7 is a drawing of the communication system 2 according to the second embodiment. As depicted in FIG. 7, the communication system 2 includes mobile machines 20a to 20c and a base-station apparatus 200. In the following explanation, the mobile machines 20a to 20c are collectively represented as a mobile machine 20 unless any of them is required to be specified.

The mobile machine 20a includes a frequency-variation measuring unit 24a, a time-variation measuring unit 24b, and a sub-channel allocation determining unit 24c. Here, although the mobile machines 20a to 20c have a similar configuration, only the configuration of the mobile machine 20a is depicted in FIG. 7.

The frequency-variation measuring unit 24a measures a frequency variation based on a signal transmitted from the base-station apparatus 200. The time-variation measuring unit 24b measures a time variation based on the signal transmitted from the base-station apparatus 200. The sub-channel allocation determining unit 24c determines the mode of sub-channel to be allocated to itself (the mobile machine 20a), based on the frequency variation measured by the frequency-variation measuring unit 24a and the time variation measured by the time-variation measuring unit 24b. The mobile machine 20a then transmits to the base-station apparatus 200 information about the determined mode of sub-channel (hereinafter, referred to as "allocation information").

The base-station apparatus 200 receiving such allocation information allocates an adjacent sub-channel to the mobile machine 20a when the allocation information contains information indicative of the adjacent sub-channel. On the other hand, the base-station apparatus 100 allocates a distributed sub-channel to the mobile machine 20a when the allocation information contains information indicative of the distributed sub-channel.

Figure 8:
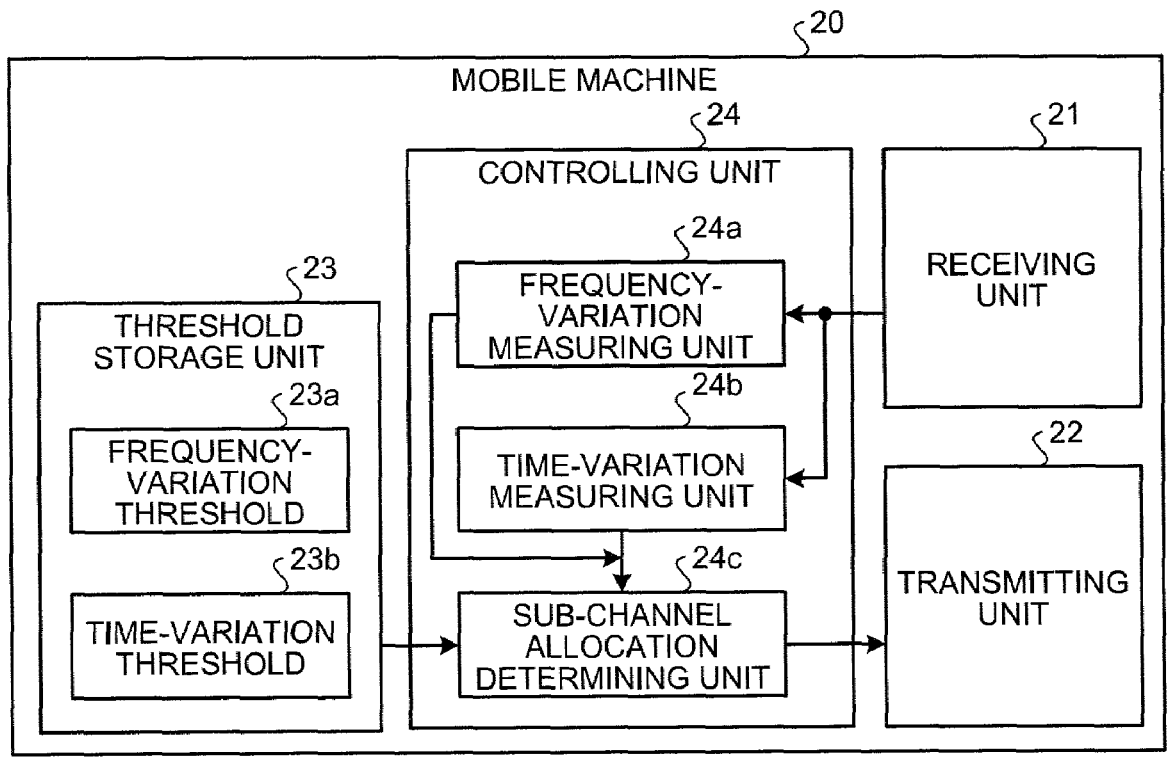
FIG. 8 is a drawing of the configuration of a mobile machine depicted in FIG. 7.

Next, the configuration of the mobile machine 20 depicted in FIG. 7 is explained. FIG. 8 is a drawing of the configuration of the mobile machine 20 depicted in FIG. 7. As depicted in FIG. 8, the mobile machine 20 includes a receiving unit 21, a transmitting unit 22, a threshold storage unit 23, and a controlling unit 24. The receiving unit 21 receives various information from the base-station apparatus 200, which will be explained further below. The transmitting unit 22 transmits various information to the base-station apparatus 200.

The threshold storage unit 23 is a storage device that stores various information, and includes a frequency-variation threshold 23a and a time-variation threshold 23b. The frequency-variation threshold 23a stores a frequency-variation threshold, as with the frequency-variation threshold 131 depicted in FIG. 3. The time-variation threshold 23b stores a time-variation threshold, as with the time-variation threshold 132 depicted in FIG. 3.

The controlling unit 24 performs a process of determining the mode of sub-channel to be allocated to itself (mobile machine 20). Also, the controlling unit 24 includes the frequency-variation measuring unit 24a, the time-variation measuring unit 24b, and the sub-channel allocation determining unit 24c.

The frequency-variation measuring unit 24a measures a frequency variation based on a signal transmitted from the base-station apparatus 200. Specifically, after measuring a delay profile of a signal transmitted from the base-station apparatus 200, the frequency-variation measuring unit 24a calculates a delay spread S by using the delay profile.

The time-variation measuring unit 24b measures a time variation based on a signal transmitted from the base-station apparatus 200. Specifically, after measuring the signal strength for every predetermined lapse of time based on the signal transmitted from the base-station apparatus 200, the time-variation measuring unit 24b measures a fading frequency fd.

The sub-channel allocation determining unit 24c determines the mode of sub-channel to be allocated to itself, based on the frequency variation measured by the frequency-variation measuring unit 24a (delay spread S) and the time variation measured by the time-variation measuring unit 24b (fading frequency fd). Specifically, as with the sub-channel allocation determining unit 143 depicted in FIG. 3, the sub-channel allocation determining unit 24c determines whether the frequency variation is larger than the frequency-variation threshold stored in the frequency-variation threshold 23a. Also, the sub-channel allocation determining unit 24c determines whether the time variation is smaller than the time-variation threshold stored in the time-variation threshold 23b.

When the frequency variation is larger than the frequency-variation threshold and the time variation is smaller than the time-variation threshold, the sub-channel allocation determining unit 24c determines an adjacent sub-channel as a sub-channel to be allocated to itself. On the other hand, when the frequency variation is equal to or smaller than the frequency-variation threshold or the time variation is equal to or larger than the time-variation threshold, the sub-channel allocation determining unit 24c determines a distributed sub-channel as a sub-channel to be allocated to itself. The sub-channel allocation determining unit 24c then transmits allocation information including information about the determined mode of sub-channel to the base-station apparatus 200 via the transmitting unit 22.

Figure 9:
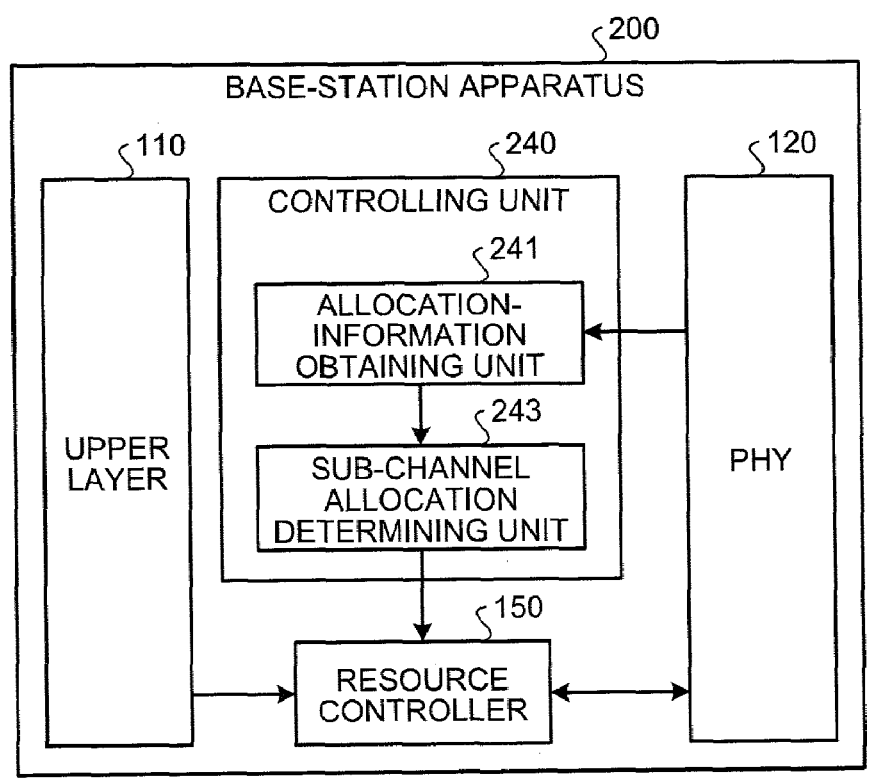
FIG. 9 is a drawing of the configuration of a base-station apparatus depicted in FIG. 7.

Next, the configuration of the base-station apparatus 200 depicted in FIG. 7 is explained. FIG. 9 is a drawing of the configuration of the base-station apparatus 200 depicted in FIG. 7. As depicted in FIG. 9, the base-station apparatus 200 includes the upper layer 110, the PHY 120, the resource controller 150, and a controlling unit 240. In the following, components having similar functions as those depicted in FIG. 3 are provided with the same reference numerals, and are not explained in detail.

The controlling unit 240 includes an allocation-information obtaining unit 241 and a sub-channel allocation determining unit 243. The allocation-information obtaining unit 241 obtains allocation information from among various information transmitted from the mobile machine 20.

The sub-channel allocation determining unit 243 determines a sub-channel to be allocated to the mobile machine 20 based on the allocation information obtained by the allocation-information obtaining unit 241. Specifically, when the allocation information contains information indicative of an adjacent sub-channel, the sub-channel allocation determining unit 243 determines to allocate the adjacent sub-channel to the mobile machine 20. On the other hand, when the allocation information contains information indicative of a distributed sub-channel, the sub-channel allocation determining unit 243 determines to allocate the distributed sub-channel to the mobile machine 20.

Figure 10:
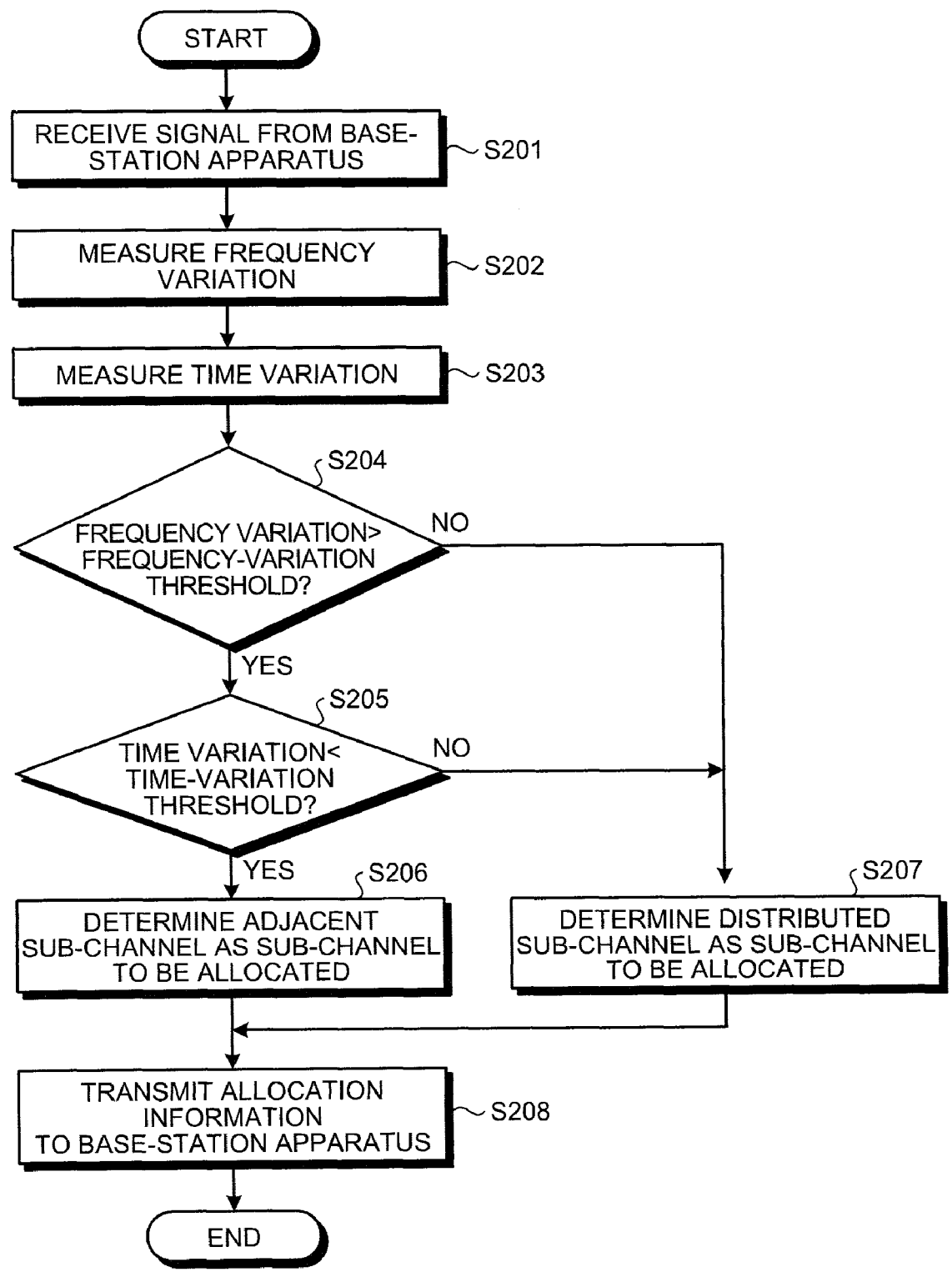
FIG. 10 is a flowchart of a procedure of an allocation-information transmitting process by the mobile machine depicted in FIG. 7.

Next, a procedure of an allocation-information transmitting process by the mobile machine 20 depicted in FIG. 7 is explained. FIG. 10 is a flowchart of a procedure of an allocation-information transmitting process by the mobile machine 20 depicted in FIG. 7. As depicted in FIG. 10, when a signal is received from the base-station apparatus 200 (Step S201), the frequency-variation measuring unit 24a of the mobile machine 20 measures a frequency variation based on the received signal (Step S202). Also, the time-variation measuring unit 24b measures a time variation based on the received signal (Step S203).

Subsequently, when the frequency variation is larger than the frequency-variation threshold (Yes at Step S204) and the time variation is smaller than the time-variation threshold (Yes at Step S205), the sub-channel allocation determining unit 24c determines an adjacent sub-channel as a sub-channel to be allocated to itself (Step S206). On the other hand, when the frequency variation is equal to or smaller than the frequency-variation threshold (No at Step S204) or the time variation is equal to or larger than the time-variation threshold (No at Step S205), the sub-channel allocation determining unit 24c determines a distributed sub-channel as a sub-channel to be allocated to itself (Step S207). The sub-channel allocation determining unit 24c then transmits allocation information containing information about the determined mode of sub-channel to the base-station apparatus 200 (Step S208).

Figure 11:
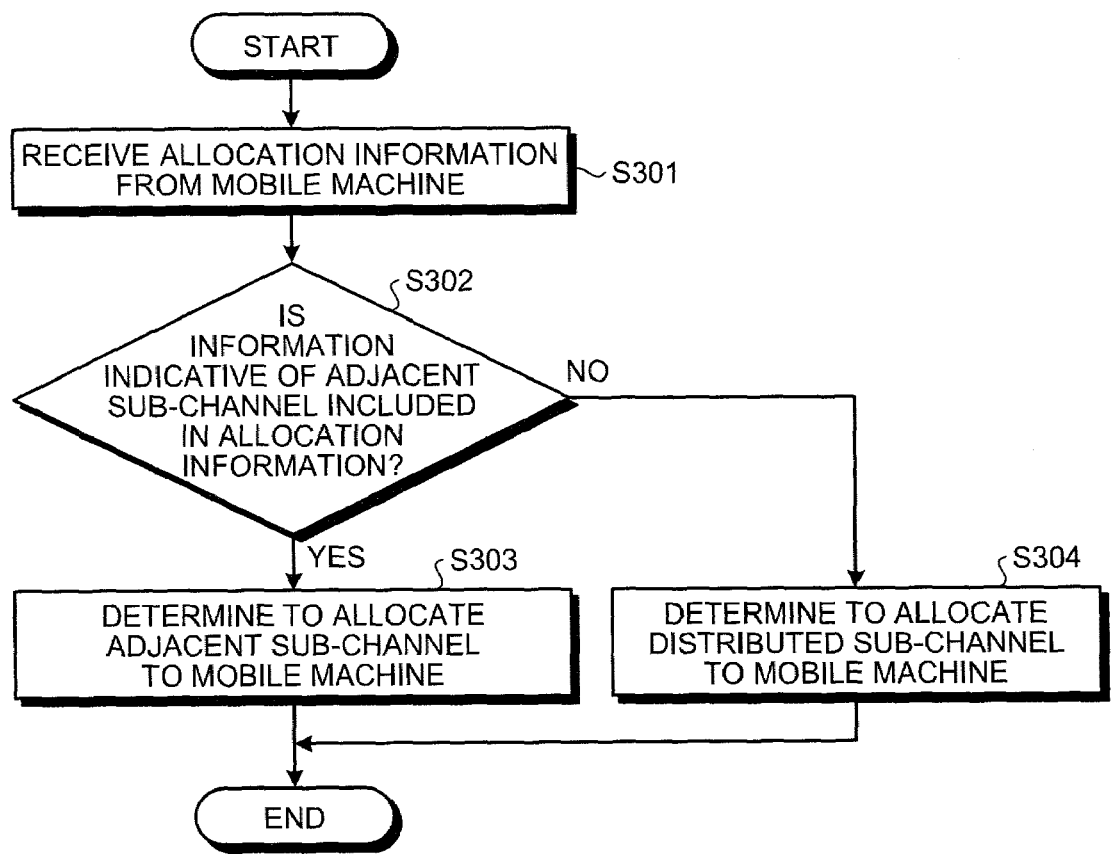
FIG. 11 is a flowchart of a procedure of a sub-channel allocation determining process by the base-station apparatus depicted in FIG. 7.

Next, a procedure of a sub-channel allocation determining process by the base-station apparatus 200 depicted in FIG. 7 is explained. FIG. 11 is a flowchart of a procedure of a sub-channel allocation determining process by the base-station apparatus 200 depicted in FIG. 7. As depicted in FIG. 11, the allocation-information obtaining unit 241 of the base-station apparatus 200 receives the allocation information from the mobile machine 20 (Step S301).

Subsequently, when the allocation information contains information indicative of an adjacent sub-channel (Yes at Step S302), the sub-channel allocation determining unit 243 determines to allocate the adjacent sub-channel to the mobile machine 20 (Step S303). On the other hand, when the allocation information does not contain information indicative of an adjacent sub-channel (No at Step S302) but contains information indicative of a distributed sub-channel, the sub-channel allocation determining unit 243 determines to allocate the distributed sub-channel to the mobile machine 20 (Step S304).

As explained above, in the communication system 2 according to the second embodiment, the mobile machine 20 measures a frequency variation and a time variation based on the signal transmitted from the base-station apparatus 200. Then, based on the measured frequency variation and time variation, the mobile machine 20 determines either an adjacent sub-channel or a distributed sub-channel as the mode of a sub-channel to be allocated to itself. The mobile machine 20 then transmits the allocation information containing the determined mode of sub-channel to the base-station apparatus 200. The base-station apparatus 200 receiving the allocation information determines, based on the allocation information, either an adjacent channel or a distributed sub-channel as a sub-channel to be allocated to the mobile machine 20. With this, the communication system 2 can appropriately allocate a sub-channel according to the wireless propagation environment where the mobile machine is located, without causing a reception error at the mobile machine.

Here, as with the time-variation measuring unit 142, the time-variation measuring unit 24b may measure a traveling speed of the mobile machine to calculate the fading frequency fd or the fading pitch Td. In this case, the mobile machine 20 regularly measures the position (coordinates) where the mobile machine 20 itself is located to measure a traveling speed of itself from a traveling distance with a lapse of time. Here, the mobile machine 20 uses a Global Positioning System (GPS) to measure the position (coordinates) where the mobile machine 20 itself is located.

Meanwhile, in the first and second embodiments, the example of the base-station apparatuses 100 and 200 is explained that determines a transmission capacity to be allocated to each sub-channel based on a zone size transmitted from an upper apparatus or a predetermined processing unit. However, the base-station apparatus may determine the transmission capacity to be allocated to each sub-channel based on a ratio between the number of mobile machines to which adjacent sub-channels are allocated and the number of mobile machines to which distributed sub-channels are allocated. Thus, in a third embodiment, an example of the base-station apparatus that determines a transmission capacity allocated to each sub-channel based on a ratio between the number of mobile machines to which sub-channels are allocated is explained.

Figure 12:
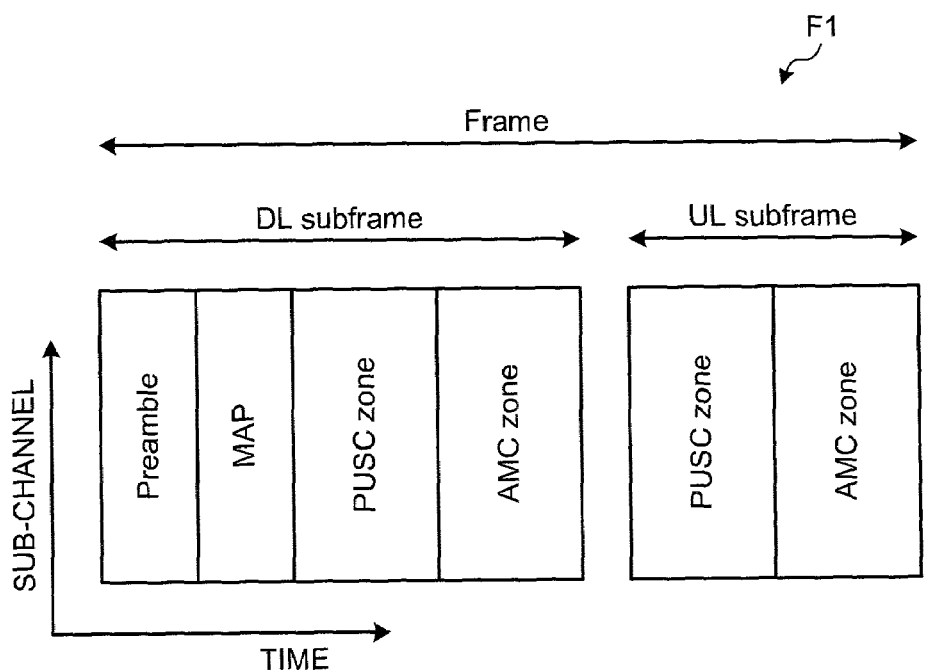
FIG. 12 is a conceptual drawing of a frame structure in an OFDMA technique.

First, for explanation of a general outline of a base-station apparatus 300 according to the third embodiment, the structure of a frame in the OFDMA technique is explained. FIG. 12 is a conceptual drawing of a frame structure in the OFDMA technique. For a frame F1 depicted in FIG. 12, the vertical axis indicates a sub-channel (frequency band), whilst the horizontal axis indicates a time slot. Also, the frame F1 includes a PUSC zone to which a distributed sub-channel is allocated with the use of the PUSC technique and an AMC zone to which an adjacent sub-channel is allocated with the use of the Band-AMC technique. The PUSC zone and the AMC zone are allocated to a plurality of mobile machines, and are regions for transmitting user data. Such regions determine the transmission capacity, and are varied with the number of sub-channels and the number of time slots.

The base-station apparatus 300 according to the third embodiment varies the regions of the PUSC zone and the AMC zone according to the ratio between the number of mobile machines to which distributed sub-channels are allocated and the number of mobile machines to which adjacent sub-channels are allocated. For example, when the number of mobile machines to which distributed sub-channels are allocated is "5" and the number of mobile machines to which adjacent sub-channels are allocated is "2", the base-station apparatus 300 controls so that the ratio of the region of the PUSC zone and the region of the AMC zone is "5:2". With this, the base-station apparatus 300 can efficiently use the wireless resources.

Figure 13:
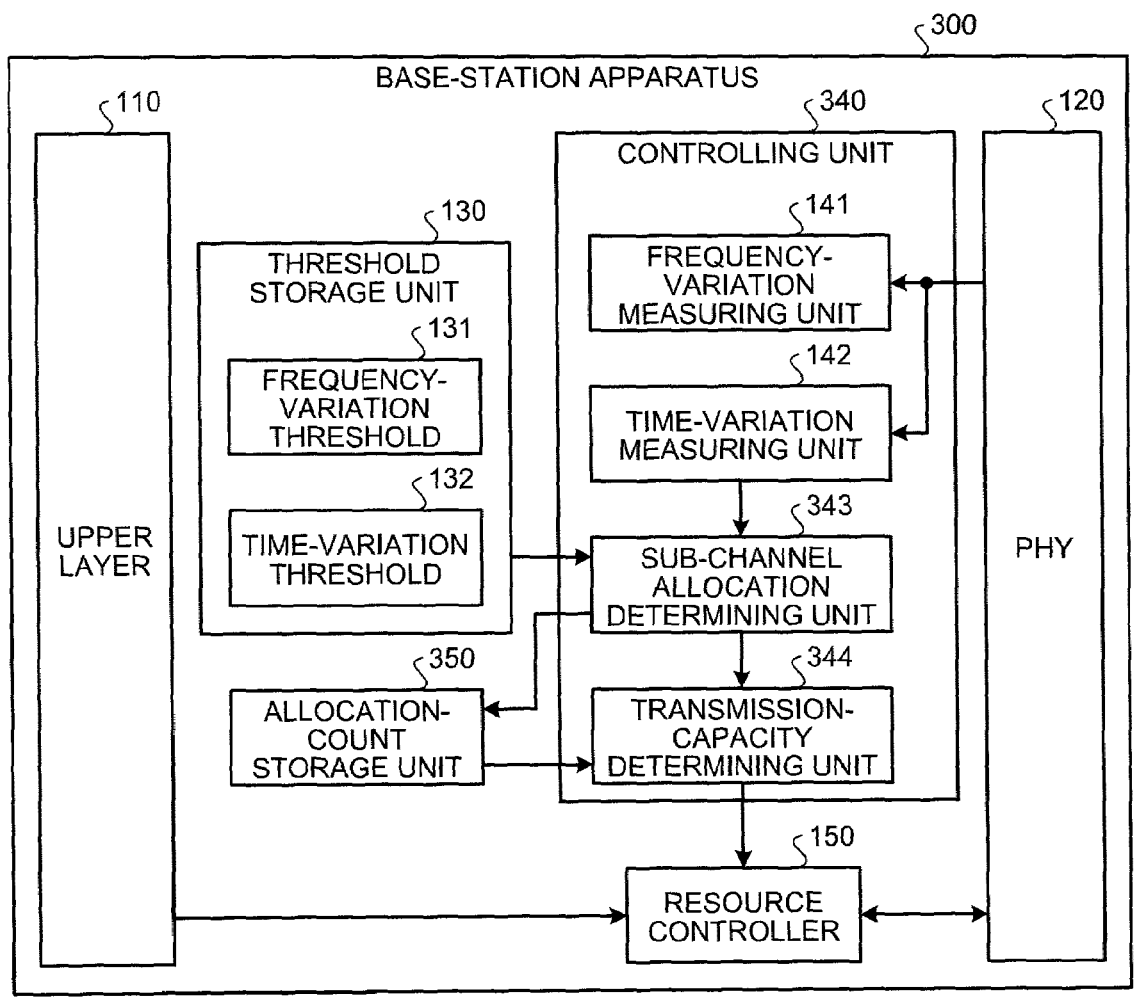
FIG. 13 is a drawing of the configuration of a base-station apparatus according to a third embodiment.

Next, the configuration of the base-station apparatus 300 according to the third embodiment is explained. FIG. 13 is a drawing of the configuration of the base-station apparatus 300 according to the third embodiment. As depicted in FIG. 13, compared with the base-station apparatus 100 depicted in FIG. 3, the base-station apparatus 300 includes a controlling unit 340 in place of the controlling unit 240. Also, compared with the base-station apparatus 100 depicted in FIG. 3, the base-station apparatus 300 newly includes an allocation-count storage unit 350.

The allocation-count storage unit 350 stores the number of mobile machines to which distributed sub-channels are allocated and the number of mobile machines to which adjacent-sub-channels are allocated. The allocation-count storage unit 350 is updated by a sub-channel allocation determining unit 343, which will be explained below.

Compared with the controlling unit 140 depicted in FIG. 3, the controlling unit 340 includes the sub-channel allocation determining unit 343 in place of the sub-channel allocation determining unit 143, and further newly includes a transmission-capacity determining unit 344. As with the sub-channel allocation determining unit 143, the sub-channel allocation determining unit 343 determines a sub-channel to be allocated to the mobile machine based on the frequency variation and the time variation. Also, the sub-channel allocation determining unit 343 causes the number of mobile machines to which distributed sub-channels are allocated and the number of mobile machines to which adjacent sub-channels are allocated to be stored in the allocation-count storage unit 350.

The transmission-capacity determining unit 344 determines the size of the PUSC zone and the size of the AMC zone in the frame F1 based on various information stored in the allocation-count storage unit 350. Specifically, the transmission-capacity determining unit 344 obtains the ratio between the number of mobile machines to which distributed sub-channels are allocated and the number of mobile machines to which adjacent sub-channels are allocated from the allocation-count storage unit 350. Subsequently, the transmission-capacity determining unit 344 determines the size of the PUSC zone and the size of the AMC zone so that the ratio between the size of the PUSC zone and the size of the AMC zone in the frame F1 is equal to the ratio obtained from the allocation-count storage unit 350.

Figure 14:
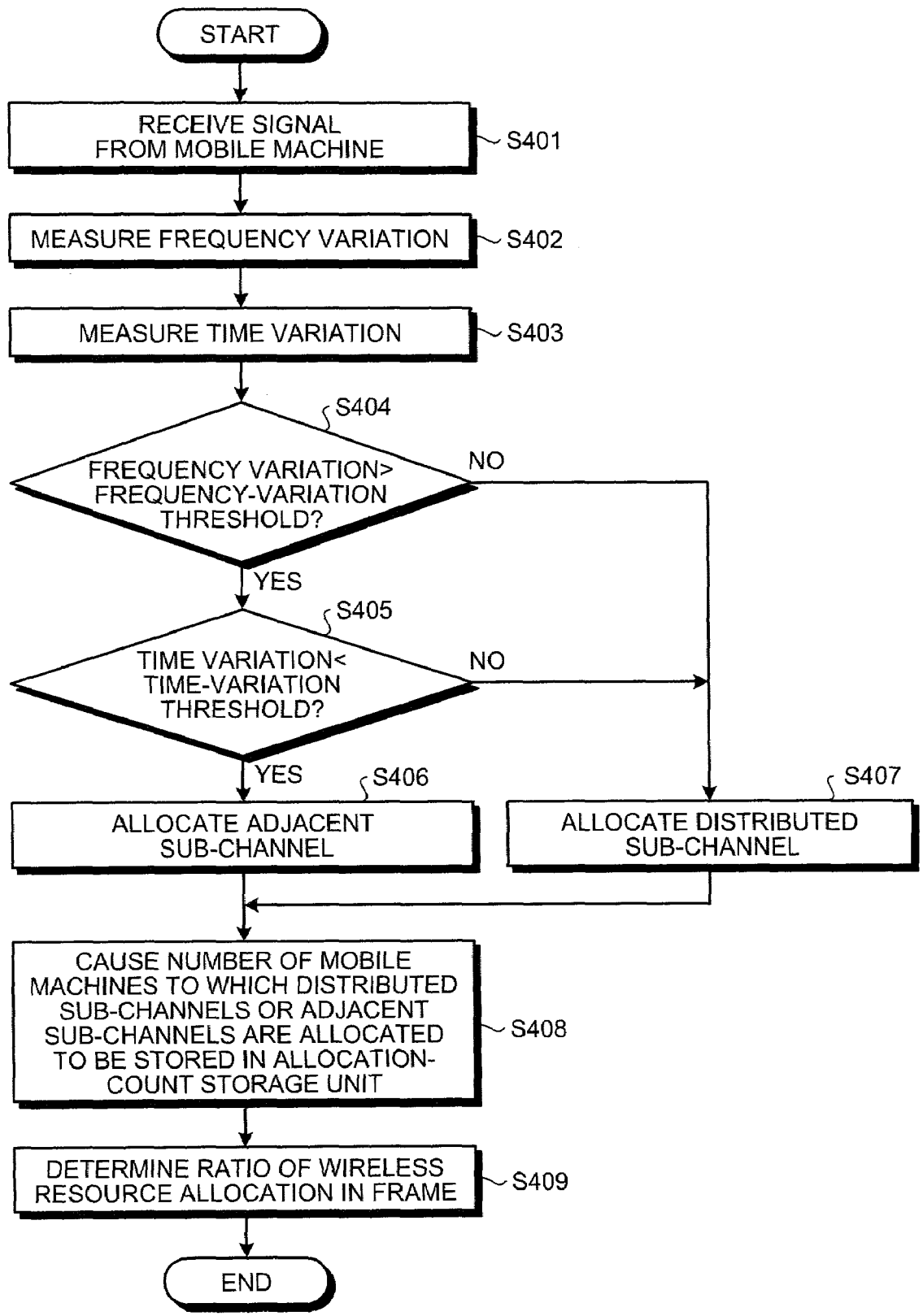
FIG. 14 is a flowchart of a procedure of a sub-channel allocation determining process by the base-station apparatus according to the third embodiment.

Next, a procedure of a sub-channel allocation determining process by the base-station apparatus 300 according to the third embodiment is explained. FIG. 14 is a flowchart of a procedure of a sub-channel allocation determining process by the base-station apparatus 300 according to the third embodiment. Note that processes similar to those depicted in FIG. 5 (Steps S401 to S407) are not explained herein.

As depicted in FIG. 14, after allocating a distributed sub-channel or an adjacent sub-channel to the mobile machine 10, the sub-channel allocation determining unit 343 of the base-station apparatus 300 causes the number of mobile machines to which distributed sub-channels or adjacent sub-channels are allocated to be stored in the allocation-count storage unit 350 (Step S408).

Subsequently, the transmission-capacity determining unit 344 obtains the ratio between the number of mobile machines to which distributed sub-channels are allocated and the number of mobile machines to which adjacent sub-channels are allocated from the allocation-count storage unit 350. Subsequently, the transmission-capacity determining unit 344 determines the size of the PUSC zone and the size of the AMC zone so that the ratio between the size of the PUSC zone and the size of the AMC zone in the frame F1 is equal to the ratio obtained from the allocation-count storage unit 350 (Step S409).

As explained above, the base-station apparatus 300 according to the third embodiment determines the ratio of wireless resources based on the ratio between the number of mobile machines to which distributed sub-channels are allocated and the number of mobile machines to which adjacent sub-channels are allocated. With this, the base-station apparatus 300 can appropriately allocate a sub-channel according to the wireless propagation environment where the mobile machine is located without causing a reception error at the mobile machine, and can also efficiently use wireless resources.

Meanwhile, the sub-channel allocation determining process by the base-station apparatus 300 in the third embodiment can be applied to the base-station apparatus 200 in the second embodiment. Thus, in a fourth embodiment, an example is explained in which a base-station apparatus that allocates a sub-channel based on the mode of sub-channel determined by a mobile machine varies the regions of the PUSC zone and the AMC zone.

Figure 15:
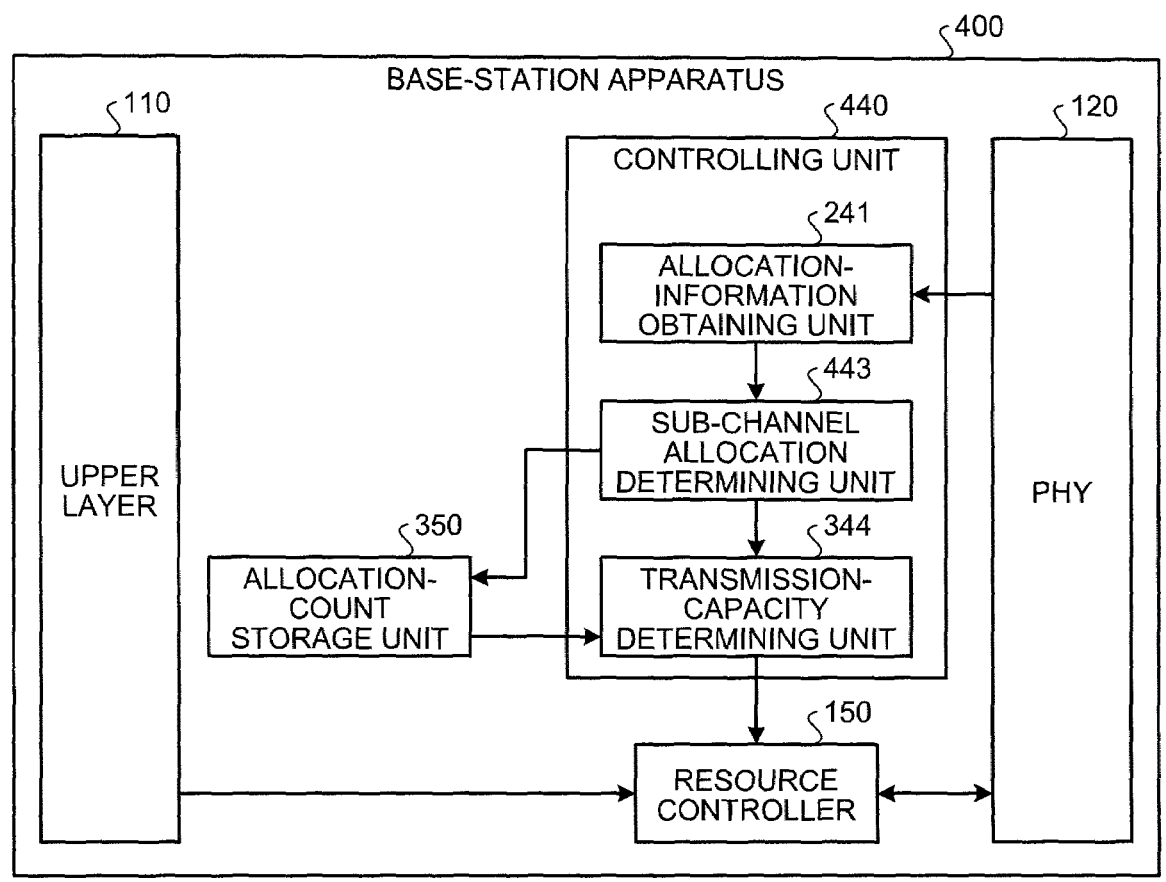
FIG. 15 is a drawing of the configuration of a base-station apparatus according to a fourth embodiment.

First, the configuration of a base-station apparatus 400 according to a fourth embodiment is explained. FIG. 15 is a drawing of the configuration of the base-station apparatus 400 according to the fourth embodiment. As depicted in FIG. 15, a controlling unit 440 of the base-station apparatus 400 includes the allocation-information obtaining unit 241, a sub-channel allocation determining unit 443, and the transmission-capacity determining unit 344.

The sub-channel allocation determining unit 443 determines a sub-channel to be allocated to the mobile machine 20 based on allocation information obtained by the allocation-information obtaining unit 241. Also, the sub-channel allocation determining unit 443 causes the number of mobile machines to which distributed sub-channels are allocated and the number of mobile machines to which adjacent sub-channels are allocated to be stored in the allocation-count storage unit 350.

The transmission-capacity determining unit 344 obtains from the allocation-count storage unit 350 updated by the sub-channel allocation determining unit 443 the ratio between the number of mobile machines to which distributed sub-channels are allocated and the number of mobile machines to which adjacent sub-channels are allocated. Subsequently, the transmission-capacity determining unit 344 determines the size of the PUSC zone and the size of the AMC zone so that the ratio between the size of the PUSC zone and the size of the AMC zone in the frame F1 is equal to the ratio obtained from the allocation-count storage unit 350.

As explained above, the base-station apparatus 400 according to the fourth embodiment determines the mode of sub-channel to be allocated to the mobile machine 20 based on the allocation information transmitted from the mobile machine 20. Also, the base-station apparatus 400 determines the ratio of wireless resources based on the ratio between the number of mobile machines to which distributed sub-channels are allocated and the number of mobile machines to which adjacent sub-channels are allocated. With this, the base-station apparatus 400 can appropriately allocate a sub-channel according to the wireless propagation environment where the mobile machine is located without causing a reception error at the mobile machine, and also can efficiently use wireless resources.

Note that embodiments configured by applying any component, representation, or arbitrary combination of the components of the base-station apparatus disclosed in the present application to a method, apparatus, system, computer program, recording medium, data structure, or the like are also effective.

According to the base-station apparatus disclosed in the present application, a sub-channel can be appropriately allocated according to the wireless propagation environment where the mobile machine is located, without causing a reception error in the mobile machine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication system in which communication is performed between a mobile machine and a base-station apparatus by using a plurality of information transmission channels with different frequency bands,
the mobile machine comprising:
a frequency-variation measuring unit that measures, based on a signal transmitted from the base-station apparatus, a frequency variation, which is a variation in signal strength of the signal with respect to a change in frequency;
a time-variation measuring unit that measures, based on the signal transmitted from the base-station apparatus, a time variation, which is a variation in signal strength of the signal with respect to a lapse of time; and
a channel allocation determining unit that determines to allocate adjacent sub-channels whose frequency bands are adjacent to each other to the mobile machine when the frequency variation measured by the frequency-variation measuring unit is larger than a predetermined frequency-variation threshold and the time variation measured by the time-variation measuring unit is smaller than a predetermined time-variation threshold, and determines to allocate distributed sub-channels whose frequency bands are distributed to the mobile machine when the frequency variation is equal to or smaller than the frequency-variation threshold or the time variation is equal to or larger than the time-variation threshold; and
the base-station apparatus comprising
a channel allocating unit that allocates either the adjacent sub-channels or the distributed sub-channels to the mobile machine based on the sub-channel determined by the channel allocation determining unit.

2. The communication system according to claim 1, wherein the base-station apparatus further comprising a transmission-capacity determining unit that determines a ratio of transmission capacities to be allocated to adjacent channels and distributed channels based on a ratio between the number of mobile machines to which the adjacent channels are allocated by the channel allocating unit and the number of mobile machines to which the distributed channels are allocated.

3. A channel-allocation controlling apparatus that allocates an information transmission channel to a mobile machine that communicates with a base-station apparatus by using a plurality of information transmission channels with different frequency bands, the channel-allocation controlling apparatus comprising:
a frequency-variation measuring unit that measures, based on a signal transmitted and received between the mobile machine and the base-station apparatus, a frequency variation, which is a variation in signal strength of the signal with respect to a change in frequency;
a time-variation measuring unit that measures, based on a signal transmitted and received between the mobile machine and the base-station apparatus, a time variation, which is a variation in signal strength of the signal with respect to a lapse of time; and
a channel allocating unit that allocates adjacent channels whose frequency bands are adjacent to each other to the mobile machine when the frequency variation measured by the frequency-variation measuring unit is larger than a predetermined frequency-variation threshold and the time variation measured by the time-variation measuring unit is smaller than a predetermined time-variation threshold, and allocates distributed sub-channels whose frequency bands are distributed to the mobile machine when the frequency variation is equal to or smaller than the frequency-variation threshold or the time variation is equal to or larger than the time-variation threshold.

4. A channel-allocation method for a base-station apparatus that communicates with a mobile machine by using a plurality of information transmission channels with different frequency bands, the channel-allocation method comprising:
in the base-station apparatus,
measuring, based on a signal transmitted from the mobile machine, a frequency variation, which is a variation in signal strength of the signal with respect to a change in frequency;

measuring, based on the signal transmitted from the mobile machine, a time variation, which is a variation in signal strength of the signal with respect to a lapse of time;

allocating adjacent channels whose frequency bands are adjacent to each other to the mobile machine when the frequency variation measured by the frequency-variation measuring is larger than a predetermined frequency-variation threshold and the time variation measured by the time-variation measuring is smaller than a predetermined time-variation threshold; and allocating distributed sub-channels whose frequency bands are distributed to the mobile machine when the frequency variation is equal to or smaller than the frequency-variation threshold or the time variation is equal to or larger than the time-variation threshold.

5. The base-station apparatus according to claim 3, further comprising a transmission-capacity determining unit that determines a ratio of transmission capacities to be allocated to adjacent channels and distributed channels based on a ratio between the number of mobile machines to which the adjacent channels are allocated by the channel allocating unit and the number of mobile machines to which the distributed channels are allocated.

6. The base-station apparatus according to claim 3, wherein
the frequency-variation measuring unit measures, as the frequency variation, a delay spread of the signal transmitted from the mobile machine.

7. The base-station apparatus according to claim 3, wherein
the frequency-variation measuring unit measures, as the frequency variation, a frequency interval in which a correlation coefficient of a correlation function in the signal strength for each of the information transmission channel has a predetermined value.

8. The base-station apparatus according to claim 3, wherein
the time-variation measuring unit measures, as the time variation, a fading frequency of the signal transmitted from the mobile machine.

9. The base-station apparatus according to claim 3, wherein
the time-variation measuring unit measures, as the time variation, a traveling speed of the mobile machine.

* * * * *